United States Patent
Lemonnier et al.

(10) Patent No.: US 12,281,576 B2
(45) Date of Patent: Apr. 22, 2025

(54) TURBOMACHINE DISTRIBUTOR COMPRISING A GAS REINTRODUCTION DUCT WITH A TANGENTIAL COMPONENT

(71) Applicant: SAFRAN AIRCRAFT ENGINES, Paris (FR)

(72) Inventors: Jérôme Claude George Lemonnier, Moissy-cramayel (FR); Franck Davy Boisnault, Moissy-cramayel (FR); Antoine Bruno Van Noort, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/546,534

(22) PCT Filed: Feb. 14, 2022

(86) PCT No.: PCT/FR2022/050265
§ 371 (c)(1),
(2) Date: Aug. 15, 2023

(87) PCT Pub. No.: WO2022/180322
PCT Pub. Date: Sep. 1, 2022

(65) Prior Publication Data
US 2024/0133311 A1    Apr. 25, 2024
US 2024/0229671 A9    Jul. 11, 2024

(30) Foreign Application Priority Data
Feb. 23, 2021 (FR) ........................ 2101739

(51) Int. Cl.
*F01D 11/12* (2006.01)
*F01D 11/02* (2006.01)

(52) U.S. Cl.
CPC ............ *F01D 11/122* (2013.01); *F01D 11/02* (2013.01); *F05D 2230/237* (2013.01); *F05D 2230/60* (2013.01)

(58) Field of Classification Search
CPC ...... F01D 11/001; F01D 11/122; F01D 11/02; F01D 11/04
See application file for complete search history.

(56) References Cited

U.S. PATENT DOCUMENTS 8,052,375 B2 * 11/2011 Turnquist ............... F16J 15/443
  415/58.7
8,202,039 B2 *  6/2012 Guemmer ........... F04D 27/0238
  415/58.7

(Continued)

FOREIGN PATENT DOCUMENTS

DE         102 14 624 C1    3/2003
DE   10 2009 025 835 A     12/2009
(Continued)

OTHER PUBLICATIONS

International Search Report issued May 31, 2022 in PCT/FR2022/050265 filed Feb. 14, 2022 2 pages.

*Primary Examiner* — Brian P Wolcott
(74) *Attorney, Agent, or Firm* — Oblon, McClelland, Maier & Neustadt, L.L.P.

(57) ABSTRACT

A distributor for a turbine of a turbomachine. The distributor includes a radially inner platform, a blade and a root which is coated with a track made of an abradable material. According to the invention, the distributor includes a leakage gas reintroduction duct. The duct includes an inlet through the track made of an abradable material, an outlet opening through a downstream surface of the root, and a (Continued)

duct intermediate portion which extends from the inlet up to the outlet. The duct intermediate portion is orientated with a tangential component.

11 Claims, 4 Drawing Sheets

(56) References Cited

U.S. PATENT DOCUMENTS

| | | | | |
|---|---|---|---|---|
| 11,466,578 | B2* | 10/2022 | Pintat | F01D 5/145 |
| 11,781,442 | B2* | 10/2023 | Girardeau | F01D 11/24 |
| | | | | 415/173.4 |
| 2009/0297341 | A1 | 12/2009 | Turnquist et al. | |
| 2009/0317232 | A1 | 12/2009 | Guemmer | |
| 2016/0281525 | A1 | 9/2016 | Nguyen et al. | |
| 2019/0284946 | A1* | 9/2019 | Berdowski | F01D 11/20 |

FOREIGN PATENT DOCUMENTS

| | | |
|---|---|---|
| EP | 2 138 727 A2 | 12/2009 |
| EP | 3 540 180 A1 | 9/2019 |
| FR | 3 034 129 A1 | 9/2016 |

* cited by examiner

TURBOMACHINE DISTRIBUTOR COMPRISING A GAS REINTRODUCTION DUCT WITH A TANGENTIAL COMPONENT

TECHNICAL FIELD

The invention relates to the general technical field of aircraft turbomachines such as turbojet engines and turboprop engines. More specifically, the invention belongs to the technical field of turbines for turbomachines. In particular, it relates to a distributor of a turbomachine high-pressure turbine.

PRIOR ART

Turbomachine turbines are conventionally formed by movable wheels and distributors, alternately arranged according to the axial direction of the turbomachine. For example, an example of the design of such a turbine is known from the document FR 3 034 129 A1.

At the junction between a movable wheel and a distributor located downstream, a leakage gas flow is often observed which escapes from a gas flow path of the turbomachine, to join a leakage gas cavity arranged radially under the root of the distributor. This leakage gas flow is usually reinjected into the flow path downstream of the distributor, after having circulated through a labyrinth seal. The leakage flow is reinjected into the flow path with a generally radial direction which is different from the flow direction of a primary flow in the flow path.

Thus, this reintroduction of the gas leak rate generates aerodynamic disturbances on the primary flow, causing losses in efficiency.

DISCLOSURE OF THE INVENTION

The invention aims to at least partially solve the problems encountered in the solutions of the prior art.

In this respect, an object of the invention is a distributor for a turbomachine turbine. The distributor extends around a longitudinal axis. The distributor comprises a radially inner platform, at least one blade extending between the radially inner platform which is configured to delimit a gas flow path radially inwardly, and a root extending radially inwards from the radially inner platform. The root is coated with a track made of an abradable material of a turbomachine rotating seal.

The distributor comprises a duct for reintroducing leakage gas into the turbomachine gas flow path. According to the invention, the duct comprises an inlet opening radially inwards the distributor through the track made of an abradable material, an outlet opening through a downstream surface of the root of the distributor, and a duct intermediate portion which extends from the inlet up to the outlet. The duct intermediate portion is oriented with a tangential component with respect to the longitudinal axis.

Thanks to the leakage gas reintroduction duct of the distributor according to the invention, the reintroduction of the leakage gas at the outlet of the duct disturbs the gas flow less in the gas flow path of the turbine. Thus, the efficiency of the turbomachine is increased.

In particular, the outlet of the duct opens under the inner platform into a region in which the pressure of the gas is low, which promotes mixing with the gas having passed through the rotating seal, while limiting the aerodynamic disturbances of the flow in the flow path.

The leakage gas at the outlet of the duct comes out of the duct with a flow tangential component which is close to that of the flow of the primary flow in the flow path. This results in a better mixing of the gas at the outlet of the duct and of the gas having passed along the blade of the distributor.

The relative position of the outlet of the duct with respect to that of the inlet of the duct tends to increase the pressure difference between the pressure of the gas at the inlet of the duct and the pressure of the gas at the outlet of the duct.

Moreover, the distributor may be manufactured easily, thanks to the relatively simple making of the leakage gas reintroduction duct.

Optionally, the invention may include one or more of the following features, combined or not.

According to a particular embodiment, the duct intermediate portion has an inner diameter which decreases from the inlet up to the outlet of the duct. The decrease in the diameter of the duct between the inlet and the outlet of the duct tends to accelerate the circulation of the leakage gas in the duct.

Preferably, the inner diameter of the duct intermediate portion decreases continuously from the inlet up to the outlet of the duct. The leakage gas tends to be further accelerated in the duct, while limiting pressure drops in the duct.

According to another particular embodiment, the duct intermediate portion is curved in the direction of the outlet of the duct. In particular, the intermediate portion is inclined tangentially in the direction of the outlet of the duct.

According to a particular embodiment, the duct intermediate portion extends with an axial component downstream from the inlet of the duct up to the outlet of the duct.

According to a particular embodiment, the duct intermediate portion is delimited radially by the track made of an abradable material and the distributor root. The duct intermediate portion is all the more easy to make, for example by means of a groove in the root of the distributor and/or in the track made of an abradable material.

According to a particular embodiment, the duct intermediate portion is substantially equidistant from the longitudinal axis from the inlet of the duct up to the outlet of the duct. The duct intermediate portion is all the more easy to make, for example by means of a groove in the root of the distributor and/or in the track made of an abradable material.

In particular, a longitudinal direction of the duct at the centre of the duct extends with an axial component and a tangential component but without a radial component with respect to the axis of the distributor.

According to a particular embodiment, the inlet of the duct extends through the abradable material from a radially inner surface of the track made of an abradable material up to the duct intermediate portion.

According to a particular embodiment, the outlet of the duct is a groove of the root extending from the duct intermediate portion up to the downstream surface of the distributor root which is radially inwards with respect to the inner platform.

According to a particular embodiment, the duct intermediate portion is a groove formed on an inner radial surface of the root to which the track made of an abradable material is fastened.

According to another particular embodiment, the inlet of the duct is oriented radially from the inner surface of the track made of an abradable material up to the duct intermediate portion.

According to another particular embodiment, the outlet of the duct is oriented radially from the duct intermediate portion up to the downstream surface of the root.

According to a particular embodiment, the outlet of the duct is substantially aligned with a trailing edge of the blade according to a gas flow direction along the trailing edge.

Preferably, the distributor includes as many leakage gas reintroduction ducts as there are blades.

The invention also relates to a turbine for a turbomachine, the turbine comprising a distributor as defined hereinabove.

Preferably, the turbine is a turbomachine high-pressure turbine. Alternatively, the turbine is a turbomachine low-pressure turbine.

Preferably, the distributor is a distributor of a second high-pressure turbine stage of a turbomachine which is located axially between a rotor wheel of a first high-pressure turbine stage and a rotor wheel of a second high-pressure turbine stage.

According to a particular embodiment, the turbine comprises a leakage gas cavity located radially inwards with respect to the distributor. The turbine comprises a rotating seal which includes the track made of an abradable material and at least two wipers which are configured to be in contact with the track made of an abradable material while being movable in rotation relative to the track made of an abradable material.

The invention also relates to a turbomachine comprising a turbine as defined hereinabove. Preferably, the turbomachine is an aircraft turbomachine. Quite preferably, the turbomachine is a twin-spool turbofan engine.

Furthermore, the invention relates to a method for manufacturing a distributor as defined hereinabove. The manufacturing method comprises drilling an inlet of the duct into the track made of an abradable material. The manufacturing method comprises making the duct intermediate portion by machining a groove along an inner radial surface of the distributor root. The manufacturing method comprises making the outlet of the duct by machining a groove along the downstream surface of the distributor root.

The manufacturing method comprises fastening the track made of an abradable material, preferably by brazing, to the distributor root, so that the inlet of the duct opens into the duct intermediate portion.

The order of the steps of drilling the inlet, making the outlet and the intermediate portion may vary. Nevertheless, they are made before fastening the track made of an abradable material to the distributor root.

Alternatively, the turbomachine distributor is for example made by additive manufacturing.

BRIEF DESCRIPTION OF THE DRAWINGS

The present invention will be better understood upon reading the description of embodiment examples, given purely by way of indicative and non-limiting example, while referring to the appended drawings wherein.

DETAILED DISCLOSURE OF PARTICULAR EMBODIMENTS

Identical, similar or equivalent parts of the various figures bear the same numerical references so as to facilitate the transition from one figure to the other.

Figure 1:
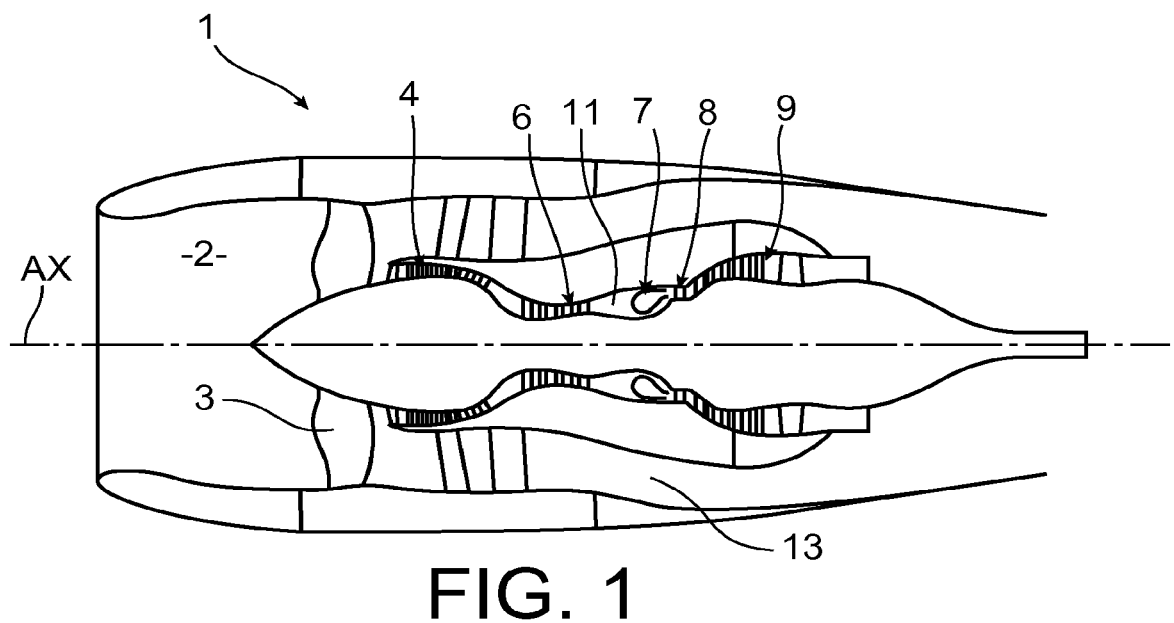
FIG. 1 is a partial schematic illustration of a turbomachine comprising a distributor according to a first embodiment of the invention.

FIG. 1 shows a twin-spool bypass turbomachine 1. The turbomachine 1 is a turbojet engine which has an axisymmetric shape around a longitudinal axis AX.

The turbomachine 1 comprises, from upstream to downstream along the path of a primary flow, an air intake sleeve 2, a fan 3, a low-pressure compressor 4, a high-pressure compressor 6, a combustion chamber 7, a high-pressure turbine 8 and a low-pressure turbine 9. This primary flow flows in a primary flow path 11 of the turbomachine 1.

The upstream and downstream directions are used in this document with reference to the overall gas flow in the turbojet engine, such a direction is substantially parallel to the direction of the longitudinal axis AX.

Unless stated otherwise, the adjectives "axial", "radial" and "circumferential", "inner" and "outer" are defined with respect to the longitudinal axis of revolution AX of the turbomachine. An axial direction is a direction substantially parallel to the longitudinal axis AX. A radial direction R-R is a direction substantially orthogonal to the longitudinal axis AX of the compressor 6 and secant with the longitudinal axis AX of the turbomachine. A circumferential or tangential direction T-T is a direction around the longitudinal axis AX. An "inner" element is closer to the longitudinal axis AX than an outer element.

The low-pressure compressor 4, the high-pressure compressor 6, the high-pressure turbine 8 and the low-pressure turbine 9 define a secondary flow path 13 for the circulation of a secondary flow that bypasses them.

The high-pressure compressor 6 and the high-pressure turbine 8 are mechanically linked by a drive shaft of the high-pressure compressor 6, to form a high-pressure spool of the turbomachine 1. Similarly, the low-pressure compressor 4 and the low-pressure turbine 9 are mechanically linked by a turbomachine shaft, so as to form a low-pressure spool of the turbomachine 1.

The low-pressure compressor 4, the high-pressure compressor 6, the combustion chamber 7, the high-pressure turbine 8 and the low-pressure turbine 9 are surrounded by an intermediate casing which extends from the inlet sleeve 2 up to the low-pressure turbine 9.

Figure 2:
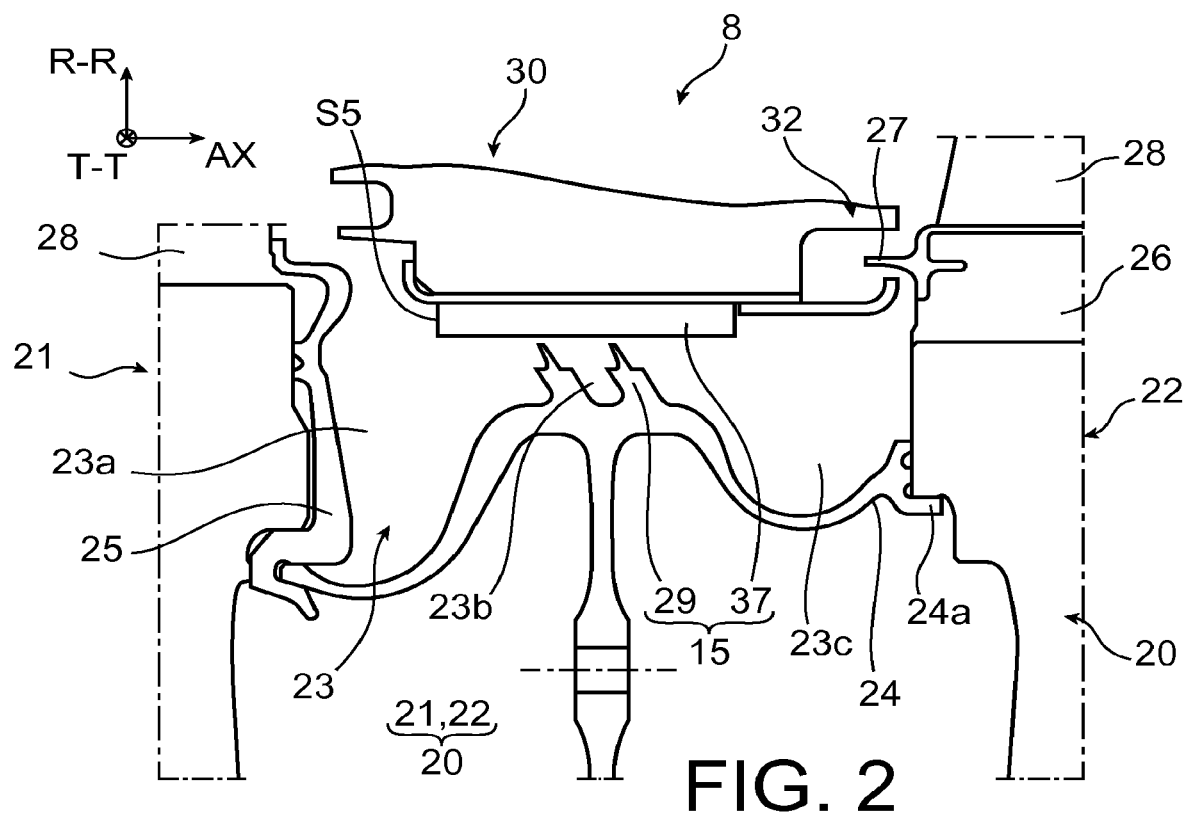
FIG. 2 is a partial schematic illustration of a high-pressure turbine of the turbomachine, comprising the distributor according to the first embodiment.

FIG. 2 partially shows a high-pressure turbine 8 of the turbomachine. The high-pressure turbine 8 includes a plurality of stages each including a rotor wheel 20 and a distributor 30.

The wheel 20 is movable in rotation around the longitudinal axis AX. It includes an annular row of movable blades 28 and a disc 26 in which the movable blades 28 are mechanically engaged while extending radially outwards from disc 26. Each wheel 20 includes a downstream flange 25 which is fastened downstream of the disc 26 and downstream of the corresponding movable blades 28.

Two axially adjacent wheels 20 are interconnected by an interdisc shroud 24, which contributes to gas sealing between these wheels 20, in particular in rotation around the longitudinal axis AX. The inter-disc shroud 24 is fastened by form-fitting to the downstream flange 25 of a wheel 20 of one stage and it includes an upstream portion 24a which is fastened by form-fitting to the upstream of the wheel 20 of the next stage.

The distributor 30 forms part of the stator of the turbomachine. In the embodiment that is shown, each distributor 30 is divided into bladed sectors according to the tangential direction T-T. Each distributor sector comprises an inner platform 32, an outer platform, a plurality of fixed blades 38 which are spaced apart from each other according to a tangential direction T-T of the distributor, a root 36 and a track 37 made of an abradable material which coats a radially inner surface S2 of the root 36.

The blades 38 extend from upstream to downstream according to the flow direction of the gases in the turbomachine from a leading edge up to a trailing edge BF. They comprise an intrados wall 38a and an extrados wall 38F which interconnect the leading edge to the trailing edge BF. They extend radially from the inner platform 32 up to the outer platform.

The inner platform 32 is delimited radially downstream by a downstream edge 34 which projects downstream from a downstream surface S4 of the root 36 of the distributor. The inner platform 32 is delimited radially outwards by an aerodynamic outer surface 51 which is in contact with the flow of the primary flow path 11. The downstream edge 34 is delimited radially inwards by an inner surface S9 which extends from the downstream surface S4 of the root up to the downstream end of the inner platform 32.

The root 36 is delimited axially upstream by an upstream surface S5 and axially downstream by the downstream surface S4. It is delimited radially outwards by a lateral surface S6 which laterally delimits the distributor 30 bladed sector. The root 36 is delimited radially outwards by the inner platform 32 and radially inwards by the radially inner surface S2 to which the track 37 made of an abradable material is fastened.

In the embodiment that is shown, the distributor 30 is a distributor of a second high-pressure turbine stage 8. It is located axially between a rotor wheel 21 of a first high-pressure turbine stage 8 and a rotor wheel 22 of a second high-pressure turbine stage 8.

Referring to FIG. 2, the high-pressure turbine 8 comprises a leakage gas cavity 23 is located radially inwards with respect to the distributor 30 and radially outwards with respect to the interdisc shroud 24. The leakage gas cavity 23 is partially sealed by a rotating seal 15.

The leakage gas cavity 23 comprises axially from upstream to downstream an upstream space 23a, an inter-wiper space 23b and a downstream space 23c. Leakage gas originating from the primary flow path 11 enters the upstream space 23a upstream of the distributor 30, then into the inter-wiper space 23b, before returning back to the primary flow path downstream of the distributor 30 by circulating through the downstream space 23c.

The upstream space 23a is delimited axially upstream by a downstream flange 25 and axially downstream by the interdisc shroud 24. It is delimited radially outwards by the track 37 made of an abradable material and by the root 36 and it is delimited radially inwards by the interdisc shroud 24.

The inter-wiper space 23b is delimited axially by two consecutive wipers of the rotating seal 15. It is delimited radially inwards by the interdisc flange 24 and radially outwards by the track 37 made of an abradable material.

The downstream space 23c is delimited axially upstream by the rotating seal 15. It is delimited axially downstream by the wheel 22 of the second stage. It is sealed radially outwards by the track 37 made of an abradable material and by the upstream spoilers 27 of the movable blades 28 of the wheel 22 of the second stage. It is delimited radially inwards by the interdisc shroud 24.

The rotating seal 15 is a labyrinth seal. It includes the track 37 made of an abradable material which is rigidly secured to the root 36 and to at least two wipers 29 which are rigidly secured to the interdisc shroud 24. It limits the flow of leakage gas through the leakage gas cavity 23, to improve the performances of the turbomachine 1.

The wipers 29 of the rotating seal 15 are configured to be in contact with the track 37 made of an abradable material while being movable in rotation relative to the track 37 made of an abradable material. They are able to dig into the track 37 made of an abradable material, in particular in case of differential expansions during the operation of the turbomachine 1.

Referring more specifically to FIGS. 3 to 6, the distributor 30 comprises a duct 40 for reintroducing the leakage gas into the primary flow path 11. The duct 40 is configured to make the gas circulate from the leakage gas cavity 23 up to the primary flow path 11 downstream of the distributor 30. The leakage gas reintroduction duct 40 comprises, from upstream to downstream, an inlet 42, a duct intermediate portion 50 and an outlet 46.

Figure 3:
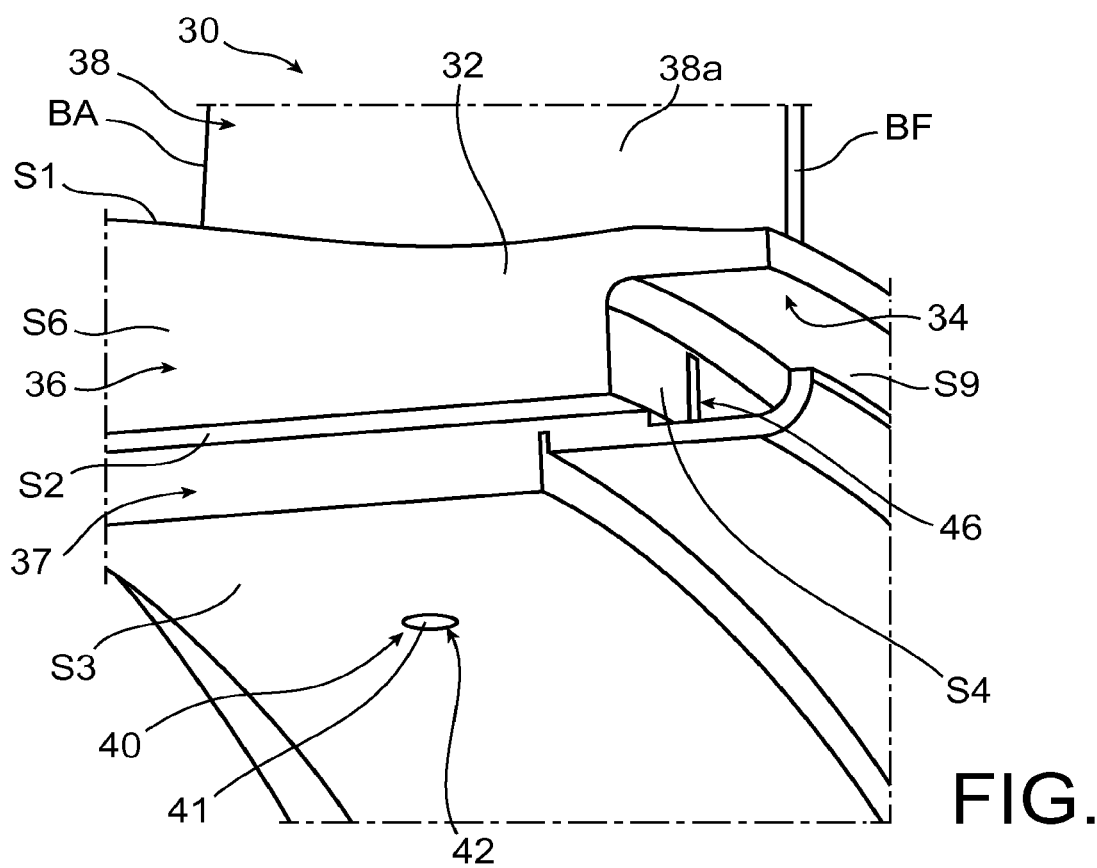
FIG. 3 is a partial perspective illustration of the distributor according to the first embodiment.
Figure 5:
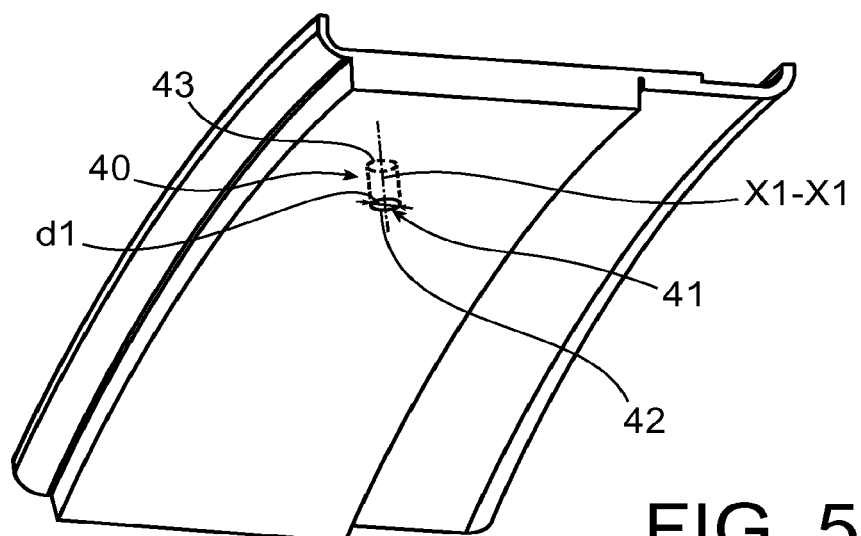
FIG. 5 is an illustration of the track made of an abradable material of the distributor according to the first embodiment.

Referring to FIGS. 3 and 5 in combination, the inlet 42 extends inside the distributor 30 up to an outlet orifice 43 which opens into the duct intermediate portion 50.

To facilitate the manufacture of the inlet 42, the inlet 42 of the duct 40 is formed by a cylindrical bore with a circular section around an axis of revolution X1-X1, in the first embodiment. In particular, the diameter d1 of the inlet 42 is substantially constant. The inlet 42 is oriented radially from the inner surface of the track 37 made of an abradable material up to the duct intermediate portion 50.

The inlet 42 opens onto the outside of the distributor 30 through a drawing orifice 41 which is formed in a radially inner surface S3 of the track 37 made of an abradable material. The drawing orifice 41 is located axially between two wipers 29 of the rotating seal 15.

Because of the position of the drawing orifice 41 at the level of the rotating seal 15, the pressure of the gas at the inlet 42 of the duct is high, which facilitates the leakage gas circulation in the duct 40 in the direction from the outlet 46. Moreover, the flow rate of the leakage gas that circulates in the duct 40 is limited.

Figure 6:
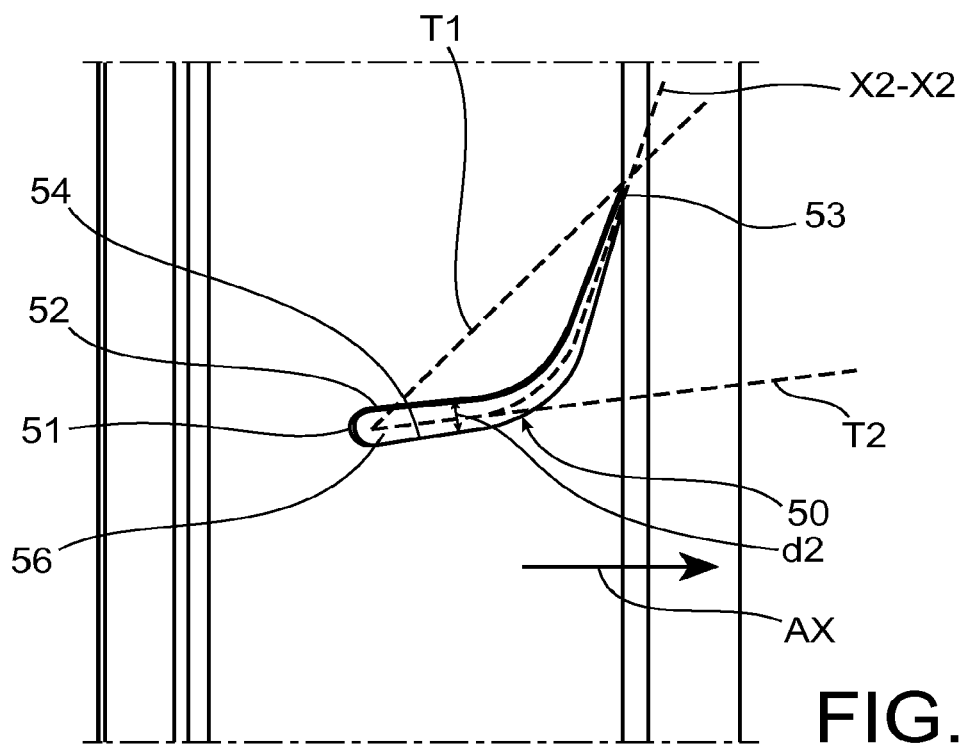
FIG. 6 is an axial sectional view of the distributor according to the first embodiment through the distributor root.

Referring to FIGS. 3 and 6 in combination, the duct intermediate portion 50 extends from the inlet 42 up to the outlet 46 which it fluidly connects. In the embodiment that is shown, it is formed by a groove which is machined on the radially inner surface S2 of the root 36.

The duct intermediate portion 50 includes an inlet section 51 which is fluidly connected to the outlet orifice 43 of the inlet 42. It includes an outlet section 53 which is fluidly connected to the outlet 46.

In general, the duct intermediate portion 50 extends with an axial component T2 downstream from the inlet 42 of the duct 40 up to the outlet 46 of the duct 40. It is oriented with a tangential component T1 with respect to the longitudinal axis AX, so as to bring the flow direction of the leakage gas closer to that of the gas having passed along the blade 38 in the primary flow path 11.

The duct intermediate portion 50 is curved axially downstream with a tangential component T-T in the direction of the outlet 46 of the duct 40. In particular, the centreline X2-X2 of the duct intermediate portion 50 in axial section of the distributor through the duct intermediate portion 50 is curvilinear. The centreline X2-X2 of the duct intermediate portion 50 is substantially equidistant from the longitudinal axis AX from the inlet 42 of the duct 40 up to the outlet 46 of the duct 40.

In axial section through the root 36, the duct intermediate portion 50 is delimited laterally by a first lateral wall 52 and a second lateral wall 54. The first lateral wall 52 and the second lateral wall 54 are connected by a bottom wall 56 which delimits the duct intermediate portion 50 radially outwards. The first lateral wall 52 and the second lateral wall 54 define a variable inner diameter d2 of the duct intermediate portion 50.

The inner diameter d2 decreases from the inlet 42 up to the outlet 46 of the duct 40. More specifically, the inner diameter d2 of the duct intermediate portion 50 according to the first embodiment decreases continuously uniformly from the inlet 42 up to the outlet 46 of the duct 40. The decrease in the diameter d2 of the duct tends to accelerate the circulation of the leakage gas in the duct 40. The uniform decrease in the diameter d2 of the duct intermediate portion 50 tends to limit the pressure drops in the duct 40, compared to sudden changes in the inner diameter of the duct.

Figure 4:
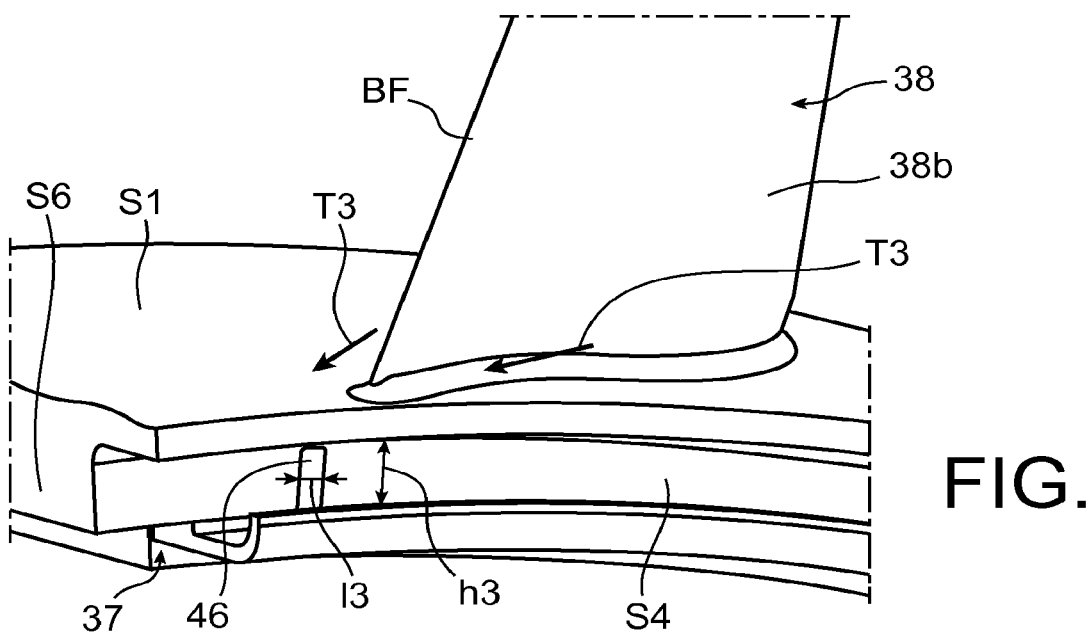
FIG. 4 is a partial rear view of the distributor according to the first embodiment.

Referring to FIGS. 3 and 4 in combination, the outlet 46 of the duct 40 is formed by a groove through the downstream surface S4 of the root. It extends radially from the duct intermediate portion 50 up to a junction region of the downstream surface S4 and of the inner surface S9 of the downstream edge 34 of the inner platform 32. In this respect, the outlet 46 extends over a length l3 which is substantially equal to the radial length of the root 36. The width h3 of the outlet 46 is substantially constant.

The outlet 46 opens into the primary flow path 11 under the inner platform 32, in a gas low-pressure region, which promotes the flow of the leakage gas through the outlet 46 and which limits the aerodynamic disturbances of the flow in the primary flow path 11 downstream of the outlet 46.

Moreover, mixing of the leakage gas at the outlet of the duct 40 with the gas having passed along the corresponding distributor blade 38 is delayed by the downstream edge 34 of the inner platform 32 which is located radially between the outlet 46 and the trailing edge BF of the corresponding blade 38 which physically separates it. The leakage gas at the outlet 46 of the duct may also mix with the leakage gas having passed through the rotating seal 15 along the inner surface S9 of the downstream edge 34 of the inner platform 32, before the leakage gas mixes downstream of the distributor 30 in the primary flow path 11 with the gas having passed along the blade 38 of the distributor.

The outlet 46 of the duct 40 is aligned with a trailing edge BF of the blade 38 according to a gas flow direction T3 along the trailing edge BF, while being at a radial distance from the gas flow in the primary flow path 11 along the trailing edge BF. The outlet 46 of the duct 40 is also aligned circumferentially with the trailing edge BF of the blade 38.

The leakage gas at the outlet 46 of the duct comes out of the duct 40 with a flow tangential component T-T which is locally parallel to that of the circulation of the flow in the primary flow path 11. This results in a better mixing of the gas at the outlet 46 of the duct and of the gas having passed along the blade 38 of the distributor 30.

The relative position of the outlet 46 of the duct with respect to that of the inlet 42 of the duct tends to increase the pressure difference between the pressure of the gas at the inlet 42 of the duct and the pressure of the gas at the outlet 46 of the duct, while limiting the pressure drops in the leakage gas reintroduction duct 40. This tends to increase the speed of the leakage gas arriving in the primary flow path 11 so that this speed is closer to that of the gas flowing in the primary flow path 11 while having passed along the blade 38. Mixing of the leakage gas and of the gas of the primary flow path 11 is thereby improved.

Figure 7:
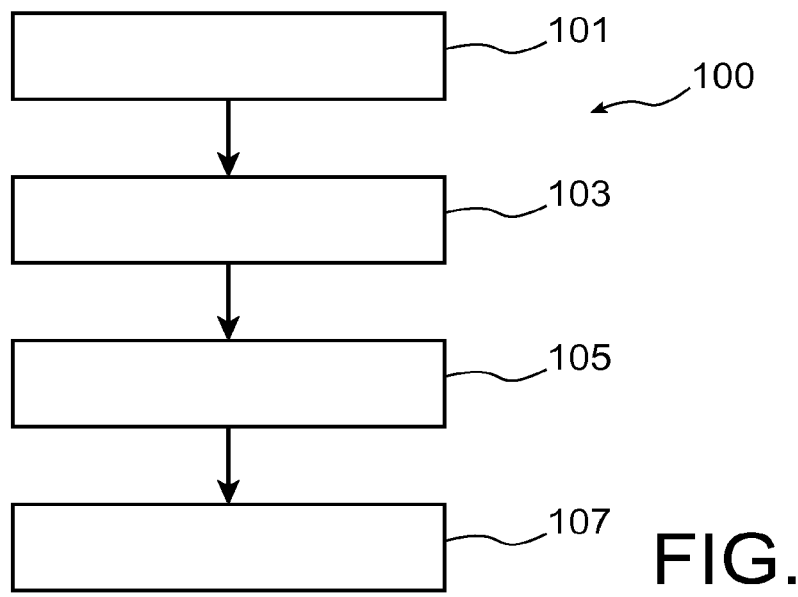
FIG. 7 illustrates a method for manufacturing a distributor according to the first embodiment.

The method for manufacturing the distributor 30 is described hereinbelow with reference to FIGS. 5 to 7.

The manufacturing method 100 comprises the prior manufacture of the root 36 of the distributor on the one hand and of the track 37 made of an abradable material on the other hand, before making the leakage gas reintroduction duct 40.

Making of the duct 40 comprises drilling 101 the inlet 42 with reference to FIG. 5, machining 103 the duct intermediate portion 50 with reference to FIG. 6, and machining 105 the outlet 46 of the duct. These steps may be carried out successively, in different orders, or simultaneously.

The inlet 42 is drilled in the track 37 made of an abradable material from the inner surface S3 of the track made of an abradable material up to the radially inner surface S2 of the root 36, in particular by electro-machining.

The duct intermediate portion 50 is made by machining a groove on the radially inner surface S2 of the root 36, in particular by electro-machining.

The outlet 46 of the duct is made by machining a groove on the downstream surface S4 of the root, in particular by electro-machining.

Afterwards, the manufacturing method 100 comprises a step 107 of fastening the track 37 made of an abradable material to the distributor 30 root 36, so that the inlet 42 of the duct 40 opens into the inlet section 51 of the duct intermediate portion 50 and that the outlet section 53 of the duct intermediate portion 50 opens into the outlet 46 of the duct. The track 37 made of an abradable material is fastened to the root 36 by brazing.

Thanks to the leakage gas reintroduction duct 40 of the distributor 30 according to the invention, the mixture of the gas having passed through the rotating seal 15, of the gas at the outlet 46 of the gas reintroduction duct and of the gas having passed along the blade 38 in the primary flow path 11 is improved. The reintroduction of the leakage gas at the outlet 46 of the duct 40 disturbs the gas flow in the primary flow path 11 lesser, and the efficiency of the turbomachine 1 is increased.

In particular, the outlet 46 of the duct opens into a region of the high-pressure turbine 8 in which the pressure of the gas is low, which promotes mixing of the leakage gas with the flow in the primary flow path 11, while limiting the aerodynamic disturbances of the flow in the primary flow path 11.

Moreover, the distributor 30 may be manufactured easily, thanks to the relatively simple making of the leakage gas reintroduction duct 40.

Of course, various modifications may be made by a person skilled in the art to the invention that has just been described without departing from the scope of the disclosure of the invention.

The turbomachine 1 may have a different structure. Alternatively, the turbomachine 1 is for example a turboprop engine or a turbine engine.

The turbine according to the first embodiment may be a low-pressure turbine 9 of a turbomachine.

Alternatively, the rotating seal 15 includes other seals such as a brush seal or a segmented radial seal, between the track 37 made of an abradable material and the interdisc shroud 24. The seal may include at least three wipers 29 rather than two wipers 29.

Alternatively, the distributor 30 may be a distributor of the first high-pressure turbine stage 8.

The distributor 30 may be made in one-piece or not. It may include one single blade 38. The distributor 30 may be divided into bladed angular sectors or extend substantially over the entire circumferential length of the turbine around the longitudinal axis AX.

The structure of the distributor 30 may vary. For example, it may include a stagger between the root 36 and the radially inner platform 32. In this case, the duct intermediate portion 50 passes in particular through the stagger.

The shape of the leakage gas reintroduction duct 40 may vary. In particular, the reduction in the diameter d2 of the duct intermediate portion 50 may be non-uniform. The intermediate portion 50 may be made by machining a groove on a radially outer surface of the track 37 made of an abradable material.

The inlet 42 and/or the outlet 46 may include an axial component downstream. In addition or alternatively, the inlet 42 and/or the outlet 46 may include a tangential component. Nevertheless, the duct 40 of the distributor according to the first embodiment is particularly easy to make.

Alternatively, the outlet 46 may include a non-uniform width h3, for example by flaring when getting away from the duct intermediate portion 50.

The distributor 30 may be made by additive manufacturing.

The invention claimed is:

1. A distributor for a turbine of a turbomachine, the distributor extending around a longitudinal axis, the distributor comprising:
    a radially inner platform configured to delimit radially inwards a turbomachine gas flow path,
    at least one blade extending radially outwards from the radially inner platform and a root extending radially inwards from the radially inner platform, the root being coated with a track made of an abradable material with a rotating seal of a turbomachine, and
    a duct for reintroducing leakage gas into the turbomachine gas flow path, the duct comprising an inlet opening through the track made of an abradable material, an outlet opening through a downstream surface of the root of the distributor, and a duct intermediate portion which extends from the inlet up to the outlet, the duct intermediate portion being oriented with a tangential component with respect to the longitudinal axis,
    wherein the duct intermediate portion is a groove formed in a radially inner surface of the root to which the track made of an abradable material is fastened.

2. The distributor according to claim 1, wherein the duct intermediate portion has an inner diameter which decreases from the inlet up to the outlet of the duct, the inner diameter of the duct intermediate portion decreasing continuously from the inlet up to the outlet of the duct.

3. The distributor according to claim 1, wherein the duct intermediate portion is curved in the direction of the outlet of the duct.

4. The distributor according to claim 1, wherein the duct intermediate portion extends with an axial component downstream from the inlet of the duct up to the outlet of the duct, while being radially delimited by the track made of an abradable material and the distributor root.

5. The distributor according to claim 1, wherein the duct intermediate portion extends with an axial component downstream from the inlet of the duct up to at the outlet of the duct, the duct intermediate portion has a central point along the longitudinal axis of the duct that is substantially equidistant from the inlet and outlet of the duct.

6. The distributor according to claim 1, wherein the inlet of the duct extends through the track made of an abradable material from a radially inner surface of the track made of an abradable material up to the duct intermediate portion, and/or
    wherein the outlet of the duct is a groove of the root extending from the duct intermediate portion up to the downstream surface of the distributor root which is located radially inwards with respect to the radially inner platform.

7. The distributor according to claim 1, wherein the inlet of the duct is oriented radially from the inner surface of the track made of an abradable material up to the duct intermediate portion and/or wherein the outlet of the duct is oriented radially from the duct intermediate portion up to the downstream surface of the root.

8. The distributor according to claim 1, wherein the outlet of the duct is substantially aligned with a trailing edge of the blade according to a direction of gas flow along the trailing edge.

9. A turbine for a turbomachine comprising a distributor according to claim 1, the distributor being a distributor of a second high-pressure turbine stage of the turbomachine which is located axially between a rotor wheel of a first high-pressure turbine stage and a rotor wheel of a second high-pressure turbine stage,
    the turbine comprising a leakage gas cavity located radially inside with respect to the distributor, and a rotating seal which includes the track made of an abradable material and two wipers which are configured to be in contact with the track made of an abradable material while being movable in rotation relative to the track made of an abradable material, the rotating seal being a labyrinth seal, the inlet of the duct being located between the two wipers.

10. A turbomachine comprising a turbine according to claim 9, the turbomachine being an aircraft turbomachine.

11. A method for manufacturing a distributor according to claim 1, comprising:
    drilling the inlet of the duct in the track made of an abradable material, making the duct intermediate portion by machining a groove along a radially inner surface of the distributor root, and making the outlet of the duct by machining a groove along the downstream surface of the distributor root, and
    fastening the track made of an abradable material, by brazing, to the distributor root, so that the inlet of the duct opens into the duct intermediate portion and that the duct intermediate portion opens into the outlet.

* * * * *